Aug. 15, 1950
M. S. CURTIS ET AL
2,519,118
VARIABLE SPEED MECHANISM
Filed July 25, 1947
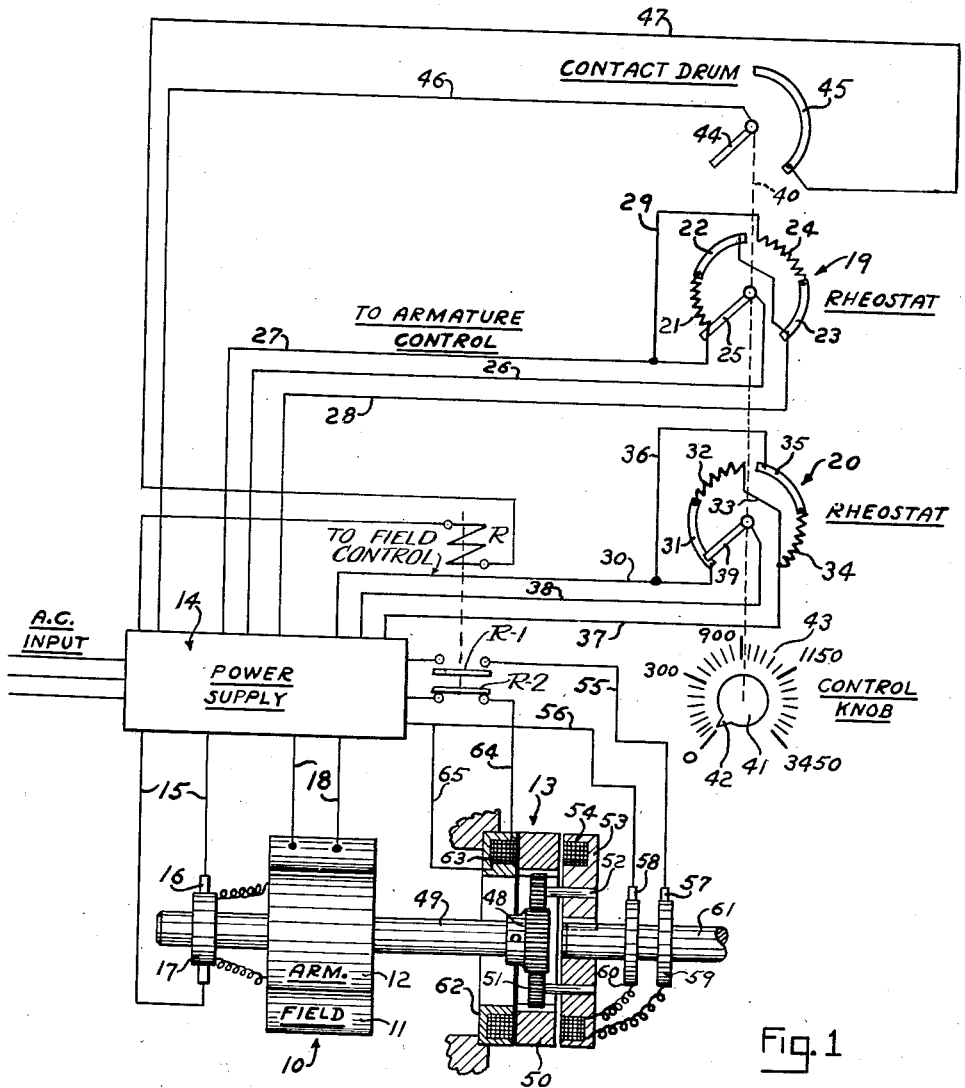
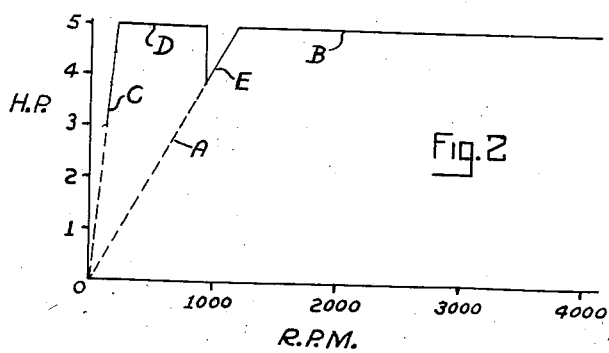
INVENTORS
MYRON S. CURTIS
ROBERT H. CLARK
BY Lewis, Hudson,
Boughton & Williams
ATTORNEYS Patented Aug. 15, 1950

2,519,118

UNITED STATES PATENT OFFICE 2,519,118

VARIABLE-SPEED MECHANISM

Myron S. Curtis, Cleveland, and Robert H. Clark, Solon, Ohio, assignors to The Warner & Swasey Company, Cleveland, Ohio, a corporation of Ohio Application July 25, 1947, Serial No. 763,482

11 Claims. (Cl. 318—406)

This invention relates to a variable speed mechanism and more particularly to a means for employing a direct current motor to operate a driven shaft at a substantially constant horsepower output for a wide range of speeds; and, while not limited thereto, is particularly useful in conjunction with machine tools and the like.

An object of the invention is to provide novel and improved means for employing an electric motor whereby a driven shaft, connected with the motor, is operated at a substantially constant horsepower throughout its entire operative range of speeds.

Another object of the invention is to provide an improved means employing a direct current motor and a change speed unit to provide a substantially constant horsepower of a driven shaft throughout a speed range thereof inclusive of speeds both greater and less than that of the basic speed of the motor.

A further object of the invention is to provide a novel and improved variable speed mechanism comprising the combination of a direct current motor with a change speed unit and means to vary the excitation of the armature and field of said motor in conjunction with means to render the change speed unit effective or ineffective to provide a speed reduction between the motor and a driven shaft, whereby the driven shaft is operated at a substantially constant horsepower throughout a speed range inclusive of speeds both greater and less than those of the basic speed of the motor.

The invention further resides in certain novel features of construction and combinations and arrangements of parts, and further objects and advantages thereof will be apparent to those skilled in the art to which it pertains from the following description of the present preferred embodiment thereof, described with reference to the accompanying drawing in which similar reference characters represent corresponding parts and in which:

Fig. 1 is a somewhat schematic representation of the present preferred embodiment of the invention; and Fig. 2 is a graphical representation of the horsepower and speed of the driven shaft of the mechanism illustrated in Fig. 1.

Referring first to Fig. 1 of the drawing, the numeral 10 designates generally a direct current electrical motor of the shunt type comprising the usual field 11 and armature 12, the shaft of the latter being connected to a change speed unit, generally designated 13, which will be hereinafter described in detail. The motor 10 is operated from a suitable source of electrical power of the alternating type by means of a conventional power supply 14, which may comprise a motor generator set, thyratron tubes, or other means for rectifying the alternating current to direct current. The current for the armature 12 is conducted thereto by leads 15, connecting the power supply 14 with the usual brushes 16 and commutator 17 of the motor, while the electrical current for the field 11 is conducted thereto by the leads 18 connected with the power supply 14.

In order to control the operation of the motor 10, two rheostats of the potentiometer type, designated generally 19 and 20, are employed to control the voltage applied to the armature and the field of the motor 10, respectively. The rheostat 19 includes a resistance 21 connected in series with a contact segment 22 which is in turn connected in series with a contact segment 23, the latter being in turn connected in series with a second resistance 24. The movable contact arm 25 of the rheostat 19 is adapted to be moved over the resistances and segments 21, 22, 24, 23 in that sequential order to thereby vary the voltage applied to the armature of the motor. For this purpose the rheostat 19 is connected with the power supply 14 in a manner to control the voltage supplied from the latter to the leads 15, the movable contact arm 25 being connected to the power supply 14 by a wire 26, one end of the resistance 21 being connected to the power supply 14 by a wire 27, the segment 23 being connected to the power supply by a wire 28, and the segments 23 and the resistance 24 being connected in parallel about the resistance 21 and segment 22 by a wire 29.

The rheostat 20 employs similar resistances and segments together with a movable contact arm to control the voltage applied to the field 11 of the motor 10. Thus, a wire 30 connects the power supply 14 to one end of a conducting segment 31, the other end of which is connected with one end of a resistance 32. The other end of the resistance 32 is connected by a wire 33 to one end of a resistance 34, the other end of the latter being connected with one end of a conducting segment 35, the other end of which is connected by a wire 36 to the wire 30. The point of connection of the wire 33 to the resistance 34 is connected by a wire 37 to the power supply 14 and a wire 38 connects the power supply 14 to a movable contact arm 39 of the rheostat which is adapted to be moved over the segment 31, resistance 32, segment 35 and resistance 34 in that order, as hereinafter described.

The movable contact arms 25 and 39 are fixed to, but insulated from, a single rotatable control shaft 40, the outer end of which is provided with a control knob 41 having an integral pointer 42 adapted to cooperate with stationary calibrations 43 indicative of the R. P. M. delivered by the driven shaft of the unit comprising the motor 10 and the change speed unit 13. Also fixed to the shaft 40 to rotate therewith, but insulated therefrom, is a contact arm 44 adapted to cooperate with the stationary contact segment or drum 45. The contact arm 44 is connected to the power supply 14 by a wire 46 and the contact segment or drum 45 is connected in series with a relay R and with the power supply 14 by a wire 47. The construction is such that the arm 44 is disengaged from the segment 45 while the arms 25 and 39 are in contact with the resistance 21 or segment 22 and segment 31 or resistance 32, respectively; and the arm 44 engages the segment 45 when the arm 25 engages the resistance 24 or segment 23 and the arm 39 engages the segment 35 or resistance 34. When the arm 44 engages the segment 45 the relay R is energized thus closing its normally open contacts R—1 and opening its normally closed contacts R—2 thereby controlling the operation of the unit 13 as hereinafter described.

The change speed unit 13 illustrated is of the epicyclic type although it will be apparent that other types of change speed units may be employed. The illustrated unit comprises a sun gear 48 fixed to the armature shaft 49 of the motor 10, a ring gear 50, and a plurality of planetary gears 51 which are rotatably mounted upon stud shafts 52 carried by a disk 53. The ring gear 50 is shown as carried by the planetary gears 51, there being three or more of said planetary gears employed in this illustrated embodiment. It will be apparent, however, that the ring gear 50 may be supported in any other suitable manner to rotate in axial alignment with the shaft 49.

The disk 53 forms one part of an electromagnetic clutch and therefore is provided with a magnetic coil 54 which cooperates with ring gear 50, the latter constituting the armature of the clutch. The coil 54 is energized from the power source 14 through wires 55 and 56, brushes 57 and 58 and slip rings 59 and 60 mounted upon the output or driven shaft 61 which is keyed to the disk 53. The normally open contacts R—1 of the relay R are interposed in the wire 55 so that the energization of the coil 54 is controlled by the operation of the knob 41. The unit 13 is also provided with a stationary housing which includes an annular member 62 provided with a magnetic coil 63. The coil 63 has the ring gear 50 as its armature and hence the latter is held from rotation when the coil 63 is energized from the power source 14 through the wires 64 and 65 under control of the normally closed contacts R—2 of relay R which contacts are interposed in the wire 64.

The construction is such that when the contact arm 44 is disengaged from the segment 45 the relay R is deenergized so that the contacts R—2 are closed and the contacts R—1 are open. Hence, the coil 63 is energized holding the ring gear 50 stationary while the coil 54 is deenergized so that the disk 53 is free to rotate. Therefore, the disk 53 and the output or driven shaft 61 are driven at reduced speed by rotation of the sun gear 48 and the planetary gears 51. When the contact arm 44 engages the segment 45 the relay R is energized closing the contacts R—1 and opening the contacts R—2. This deenergizes coil 63 and energizes coil 54. Therefore, the ring gear 50 is now free to rotate and rotates with the disk 53 since these elements are coupled together by the magnetic attraction exerted by the coil 54. Consequently, the planetary gears 51 now act as keys between the sun gear 48 and the ring gear 50 so that the shaft 61 is driven at the same speed as the motor shaft 48.

The motor here illustrated is a direct current shunt type designed to produce 5 H. P. and to run at speeds ranging from zero to approximately three times its basic speed, the latter being in the order of 1150 revolutions per minute. If such a motor be connected directly to its load it is normally brought up to its basic speed by varying the voltage applied to its armature while holding its field voltage constant. When it reaches its basic speed the motor is then delivering its full 5 H. P. and may continue to do so for higher speeds up to three times the basic speed by keeping the armature voltage constant and varying the voltage applied to the field. This operation is well known in the art and is represented by the portions A and B of the graph comprising Fig. 2. With such operation, however, it is not possible to achieve full horsepower output for speeds less than those of the basic speed of the motor. Nevertheless, it is highly desirable that full horsepower be achieved at relatively low speeds and that the horsepower be held substantially constant throughout the entire operating speed range of the driven shaft 61. This is especially desirable when the motor is to be employed to deliver power for a machine tool or the like where many operations are performed at low speeds and requiring large amount of power at those low speeds. This desirable result is achieved in accordance with this invention by employing the apparatus illustrated in Fig. 1 which operates as follows.

With the various elements of the apparatus in the positions indicated in Fig. 1, electrical power is supplied from any suitable source of alternating current and is rectified by the power supply means 14. At this time it will be observed that the coil 63 is energized thus holding the ring gear 50 stationary so that the change speed unit 13 is rendered effective to provide a speed reduction between the armature shaft 49 and the driven shaft 61. Let it be assumed that it be desired to operate the shaft 61 at approximately 600 R. P. M. which is very materially below the basic speed of the motor, it being remembered that the basic speed of the illustrated motor is approximately 1150 R. P. M. The knob 41 is turned in a clockwise direction thereby causing the contact arm 25 to move over the resistance 21, and the contact arm 39 to move over the segment 31. Consequently, the voltage applied to the field 11 of the motor 10 will remain substantially constant while the voltage applied to the armature 12 will be varied thus increasing the torque of the motor and its speed until it achieves its maximum horsepower output of 5 H. P., the operation of the motor when the arm 25 is moved over the resistance 21 and the arm 39 is moved over the segment 31 being represented by the portion C of the graph in Fig. 2. When the contact arm 25 is moved from the resistance 21 onto the contact segment 22, which occurs when the pointer 42 is opposite the calibration 300, the motor has achieved its full horsepower output and it will retain this output while the knob 41 is further rotated to any position between the calibrations 300 and 900, since the voltage applied to the armature will remain constant while the field voltage is varied by movement of the arm 39 over the resistance 32. Consequently, when the pointer 42 of the dial 41 is in alignment with that one of the calibrations 43 which indicates a speed of 600 R. P. M., the motor 10 is operating at its full horsepower output even though the driven shaft 61 is rotating at the speed of 600 R. P. M. which is greatly less than that of the basic speed of the motor. This is due to the fact that a speed reduction is effected by the unit 13, it being understood that the motor itself is operated at its basic speed when the pointer 42 indicates the calibration 300, and the motor speed is increased above its basic speed when the pointer is moved to align with the calibrations from 300 to 900, by virtue of the operation of the contact arms 25 and 39. Hence, at any speed from 300 to 900 R. P. M. of the driven shaft 61 the horsepower thereof, and of the motor, will remain substantially constant at the maximum value as represented by the portion D of the graph in Fig. 2.

If it be desired to provide higher speeds of the driven shaft 61, the knob 41 is turned still further in a clockwise direction. When the knob has passed the calibration 900 the arm 25 of rheostat 19 will move from the segment 22 and thereafter engage the resistance 24 while the arm 39 of the rheostat 20 will move from the resistance 32 and engage the contact segment 35. At the same time the arm 44 will move into engagement with the contact segment 45 thereby energizing the relay R. Energization of relay R closes normally open contacts R—1 and opens normally closed contacts R—2 thereby energizing the coil 54 and deenergizing coil 63. Consequently, the ring gear 50 is no longer held stationary but is now rotated with the disk 53, being held in engagement therewith by the magnetic attraction effected by the energization of coil 54. Therefore, the gears 51 now act as keys so that the driven shaft 61 is driven at the same speed as that of the armature shaft 49 of the motor. That is to say, the change speed unit 13 has now been converted into a simple or direct coupling between the two shafts.

Since the contact arm 25 is now engaging the resistance 24 and the contact arm 39 is now engaging the segment 35, further clockwise rotation of the knob 41 effects a similar operation to that performed during the initial starting of the motor. That is to say, when the knob 41 is turned from approximately 900 to 1150, upon the calibrations 43, the voltage applied to the field 11 of the motor remains substantially constant and the voltage applied to the armature varies, the motor again operating at its basic speed and maximum horsepower output when the pointer 42 indicates speeds equal to or in excess of 1150 R. P. M. since the contact arms 25 and 39 are then, respectively, in contact with the segment 23 and the resistance 34. It will be understood, therefore, that when the unit 13 is converted from performing its speed reduction function to that of a direct coupling, the horsepower of the motor drops slightly in accordance with the V-shaped portion E of the graph in Fig. 2 and is brought back to full speed and full horsepower in the manner just described. Further clockwise rotation of the knob 41 will increase the speed of the motor and hence of the driven shaft 61 while maintaining the horsepower substantially constant as indicated by the portion B of the graph in Fig. 2. If it be desired to reduce the speed of the output shaft, the knob 41 is simply turned in the opposite direction and the operations are reversed from those described above as will be readily apparent without further description.

It will be observed from an inspection of the graph in Fig. 2 that the maximum horsepower of the unit is achieved at comparatively low speeds of the driven shaft 61 and is maintained substantially constant thereafter for substantially all speeds up to a speed of the driven shaft which corresponds with the maximum speed of the motor, there being only a comparatively small interval throughout this speed range, namely a portion corresponding to the portion E of the graph, at which the horsepower drops from the constant value. It will be observed that this drop corresponds to a speed of only a small range of the total speeds of the driven shaft so that the two ranges of speeds of the driven shaft at constant horsepower, below and above the basic speed of the motor, may for practical purposes be considered as forming a substantially continuous single range of speeds at constant horsepower.

While one preferred embodiment of the invention has been described in considerable detail it will be apparent that numerous modifications and adaptations may be made by those skilled in the art. Thus, the portion of the driven shaft speed range corresponding to the portion E of the graph may be varied by suitable selection of the motor, the rheostats, and of the change speed unit 13. Other changes may also be made without departing from the basic concepts of the invention. Hence, the invention is not to be considered as limited to the exact construction and mode of operation illustrated and described but only as required by the spirit and scope of the appended claims.

Having thus described our invention, we claim:

1. An apparatus of the character described comprising a direct current motor having an armature shaft, means for varying the excitation of said motor in a manner to cause it to operate through a range of speeds and at constant horsepower for all speeds above its basic speed, a driven shaft, change speed means connecting the armature shaft to said driven shaft, means for conditioning said change speed means to cause it to effect a constant speed reduction between the armature and driven shafts thereby providing a first range of speeds of said driven shaft at constant horsepower when said motor is operated at or above its basic speed, and means for conditioning said change speed means to cause it to effect a direct coupling between the armature and driven shafts thereby providing a second range of speeds of said driven shaft at constant horsepower when said motor is operating at or above its basic speed, the maximum speed of said first range of driven shaft speeds being substantially equal to the basic speed of said motor so that the two ranges of driven shaft speeds for speeds of said motor at or above its basic speed form a substantially continuous single range of speeds at constant horsepower.

2. An apparatus of the character described comprising a direct current motor having an armature shaft, means for varying the excitation of said motor in a manner to cause it to operate through a range of speeds and at constant horsepower for all speeds above its basic speed, a driven shaft, change speed means connecting the armature shaft to said driven shaft, means for conditioning said change speed means to cause it to effect a speed reduction between the armature and driven shafts thereby providing a first range of speeds of said driven shaft at constant horsepower when said motor is operated at or above its basic speed, means for conditioning said change speed means to cause it to effect a direct coupling between the armature and driven shafts thereby providing a second range of speeds of said driven shaft at constant horsepower when said motor is operating at or above its basic speed, the maximum speed of said first range of driven shaft speeds being substantially equal to the basic speed of said motor so that the two ranges of driven shaft speeds for speeds of said motor at or above its basic speed form a substantially continuous single range of speeds at constant horsepower, and a single control member operatively connected with both the said means for varying the excitation of said motor and with the said means for conditioning of said change speed means for actuating the two last-mentioned means in predetermined sequence.

3. An apparatus as defined in claim 2 and in which the means for varying the excitation of said motor includes means for causing the motor to be operated through its range of speeds by said control member when the latter is conditioning the change speed means to provide either the first or second ranges of driven shaft speeds.

4. An apparatus of the character defined in claim 2 and in which the means for varying the excitation of said motor comprises two portions each capable of varying the speed of said motor and adapted to be successively utilized, the said portions being so constructed and arranged and cooperating with the said control member in a manner such that one portion is utilized when said control member is positioned to provide speeds of said driven shaft in said first range thereof and the other of said portions is automatically rendered effective when the said control member is actuated to provide speeds of said driven shaft in said second range of speeds thereof, the transition of the control member from utilization of said one portion to utilization of said other portion automatically reducing the speed of said motor to at least its basic speed.

5. An apparatus of the character described comprising a direct current motor having a field and an armature provided with an armature shaft, means to vary the excitation of said armature while keeping the excitation of said field constant and for keeping the excitation of said armature constant while varying the excitation of said field in a manner to provide a range of speeds of said armature shaft at constant horsepower for all speeds above the basic speed of the motor, a driven shaft, a change speed unit connecting said armature and driven shafts and adapted to selectively provide a speed reduction between said armature shaft and said driven shaft or to act as a direct coupling therebetween, means for conditioning said change speed unit to effect said speed reduction between said armature and driven shafts thereby providing a first range of speeds for the driven shaft at constant horsepower when said armature shaft is rotating at or above its basic speed, means for conditioning said change speed unit to effect the said direct coupling of the armature and driven shafts thereby providing a second range of speeds of said driven shaft at constant horsepower when said armature shaft is rotating at or above its basic speed, and means for effecting selective operation of either of the two last-mentioned means, the maximum speed of said first range of driven shaft speeds being substantially equal to the basic speed of said motor so that the two ranges of driven shaft speeds for speeds of said motor at or above its basic speed form a substantially continuous single range of speeds at substantially constant horsepower.

6. An apparatus of the character described comprising a direct current motor having a field and an armature provided with an armature shaft, means to vary the excitation of said armature while keeping the excitation of said field constant and for keeping the excitation of said armature constant while varying the excitation of said field in a manner to provide a range of speeds of said armature shaft at constant horsepower for all speeds above the basic speed of the motor, a driven shaft, a change speed unit connecting said armature and driven shafts, means for conditioning said change speed unit to cause it to effect a speed reduction between said armature and driven shafts thereby providing a first range of speeds for the driven shaft at constant horsepower when said armature shaft is rotating at or above its basic speed, means for conditioning said change speed unit to cause it to effect a direct coupling of the armature and driven shafts thereby providing a second range of speeds of said driven shaft at constant horsepower when said armature shaft is rotating at or above its basic speed, the maximum speed of said first range of driven shaft speeds being substantially equal to the basic speed of said motor and the minimum speed of said second range of driven shaft speeds being substantially equal to the basic speed of said motor so that the two ranges of driven shaft speeds form a substantially continuous single range of speeds at substantially constant horsepower, and a single control member for actuating the means to vary the excitation of said armature and field and to condition the operation of the speed change unit.

7. An apparatus as defined in claim 6 and in which the means for varying the excitation of said armature while keeping the excitation of said field constant and the means for keeping the excitation of said armature constant while varying the excitation of said field are so constructed and arranged that they are actuated by said control member to regulate the excitation of the armature and field in the same sequence whether the said control member is conditioning the change speed means to provide the first or second range of driven shaft speeds.

8. An apparatus as defined in claim 6 and in which said change speed unit is an epicyclic gearing train, the means for conditioning said unit to effect a speed reduction of the output shaft is an electromagnetic means adapted to hold one portion of the train stationary while permitting rotation of another portion of the train, the means for conditioning said unit to provide a direct coupling of said armature and driven shafts is a second electromagnetic means, and said control member includes means to selectively operate the said electromagnetic means in predetermined sequence with the actuation of the means to control the excitation of said armature and the means to control the excitation of said field.

9. An apparatus of the character described for providing a range of operating speeds of a driven shaft at substantially constant horsepower comprising a direct current motor, means to vary the excitation of said motor to provide a range of speeds thereof at substantially constant horsepower, a change speed means interposed between said motor and driven shaft to effect driving of said shaft by said motor with a speed reduction thereby providing speeds of said driven shaft below the basic speed of said motor when the latter is operated at speeds up to its maximum speed, means to control said change speed means to cause the latter to effect driving of said driven shaft at the same speed as that of the motor thereby providing speeds of said driven shaft above the basic speed of said motor when the speed of the latter is increased thereabove, whereby the speed range of said motor at or above its basic speed and at constant horsepower is effective to provide a range of operating speeds of said driven shaft extending both above and below the basic speed of said motor, and a single control member for actuating the means to vary the excitation of said motor and the means to control the change speed means in proper sequence.

10. An apparatus of the character defined in claim 9 and in which the means for varying the excitation of said motor comprises two portions each capable of varying the speed of said motor and adapted to be successively utilized, the said portions being so constructed and arranged that one portion is utilized when said control member is positioned to provide speeds of said driven shaft below the basic speed of said motor, and the other of said portions is automatically rendered effective when the said control member is actuated to provide speeds of said driven shaft above the basic speed of said motor, the motor speed being reduced to at least its basic speed by the transition from the first to the second portion of the means for varying the excitation of the motor to provide the minimum speed of that part of said range of driven shaft speeds extending above the basic speed of the motor.

11. An apparatus of the character described comprising a direct current motor having a field and an armature provided with an armature shaft; a change speed unit including a driven shaft and means adapted to selectively cause the armature shaft to rotate said driven shaft at a speed below that of the armature shaft or to act as a coupling for direct drive of the driven shaft by said armature shaft; and control means including means for successively varying the excitation of the armature and the field of the motor, means for selecting the operation of the change speed unit, and a single control member connected with the two last-mentioned means, whereby actuation of said single control member causes the driven shaft of said unit to be operated at substantially constant horsepower for a range of speeds thereof extending both above and below the basic speed of the motor.

MYRON S. CURTIS.
ROBERT H. CLARK.

REFERENCES CITED

The following references are of record in the file of this patent:

UNITED STATES PATENTS

| Number | Name | Date |
| --- | --- | --- |
| 657,516 | Coleman | Sept. 11, 1900 |
| 1,810,821 | Eck | June 16, 1931 |
| 2,281,844 | Jones | May 5, 1942 |
| 2,429,570 | Trofimov | Oct. 21, 1947 |